United States Patent [19]

Walker

[11] 4,429,573
[45] Feb. 7, 1984

[54] COMMON RESONATOR PASSIVE LASER ACCELEROMETER AND GYRO

[76] Inventor: Clifford G. Walker, 915 Weatherly Rd., Huntsville, Ala. 35803

[21] Appl. No.: 393,279

[22] Filed: Jun. 29, 1982

[51] Int. Cl.$^3$ ................. G01C 19/58; G01C 21/00; G01P 15/08
[52] U.S. Cl. ................................. 73/510; 73/178 R; 73/504; 73/517 R
[58] Field of Search .................. 73/504, 178, 517 R, 73/510; 356/350

[56] References Cited

U.S. PATENT DOCUMENTS

| | | | |
|---|---|---|---|
| 3,506,362 | 4/1970 | Doyle et al. | 356/111 |
| 3,517,560 | 6/1970 | Jacobs et al. | 73/516 |
| 3,800,594 | 4/1974 | Hutchings et al. | 73/516 R |
| 4,039,260 | 8/1977 | Redman | 356/106 |
| 4,155,251 | 5/1979 | Lautzenhiser | 73/141 A |
| 4,233,847 | 11/1980 | Walker | 73/517 R |
| 4,315,693 | 2/1982 | Walker | 73/517 R X |

OTHER PUBLICATIONS

Goss et al., "Fiber-Optic Rotation Sensor Technology" from Applied Optics, vol. 19, No. 6, Mar. 15, 1980, pp. 852–858.
Merz et al., "GaAs Integrated Optical Circuits by Wet Chemical Etching" from IEEE Journal of Quantum Electronics, vol. QE-15, No. 2, Feb. 1979, pp. 72–82.
Garmire, "Optical Waveguide for Laser Gyro Applications" from SPIE vol. 157, Laser Inertial Rotation Sensors, 1978, pp. 95–99.
Leonberger et al., "Low-loss GaAs p+n−n+ Three-dimensional Optical Waveguides" from Applied Physics Letters, vol. 28, No. 10, May 15, 1976, pp. 616–619.
Anderson, "Integrated Optical Spectrum Analyzer" an Imminent 'Chip'" IEEE Spectrum, Dec. 1974, pp. 22–29.

Primary Examiner—James J. Gill
Attorney, Agent, or Firm—Robert P. Gibson; Anthony T. Lane; Freddie M. Bush

[57] ABSTRACT

A dual function device measures both inertial acceleration and rotation rate using a common birefringent ring resonator. A beam from a laser source is split, forming two orthogonally polarized beams which are coupled through respective Bragg cells and into a common waveguide. The beams are subsequently coupled into a ring resonator waveguide which has a proof-mass disposed thereon for applying acceleration forces to the resonator. Acceleration is measured when forces stress the proof-mass, detuning the cavity with respect to the horizontally polarized wave and thereby affecting output energy coupled therefrom. Similarly, rotation is measured when there is a rotation rate in the plane of the waveguide, which detunes the cavity with respect to the vertically polarized beam. Output energy from the waveguide cavity is used to indicate the degree of acceleration and/or rotation and to provide feedback for restoring resonance.

7 Claims, 3 Drawing Figures

COMMON RESONATOR PASSIVE LASER ACCELEROMETER AND GYRO

DEDICATORY CLAUSE

The invention described herein may be manufactured, used, and licensed by or for the Government for governmental purposes without the payment to me of any royalties thereon.

SUMMARY OF THE INVENTION

A laser accelerometer and laser gyro utilizes a common resonator and common laser source and produce respective output beams that are modified in proportion to a change in resonant energy in the common resonant cavity. A beam from the laser source is divided into two orthogonally polarized beams and coupled to separate Bragg cells before being coupled into a common waveguide resonator. After being frequency modulated (FM) using the Bragg cells, each beam enters the common waveguide resonator. Each beam exits the ring resonator and is detected by a photodetector which is part of an electrical FM feedback circuit. Each feedback circuit maintains the respective beams resonance within the ring resonator. When a change in the magnitude of either horizontally polarized or vertically polarized energy applied to the ring resonator occurs it causes a change in the optical path length of the resonator with respect to the polarized beam, detuning the resonator and changing the beam intensity coupled out. This change in beam intensity is detected and by way of the FM feedback circuit, changes both the input frequency coupled to the Bragg cell and the output signal. This change in frequency is proportional to the change in input energy, providing an indication of acceleration or rotation and restoring resonance in the ring resonator.

DESCRIPTION OF THE PREFERRED EMBODIMENT

Figure 1:
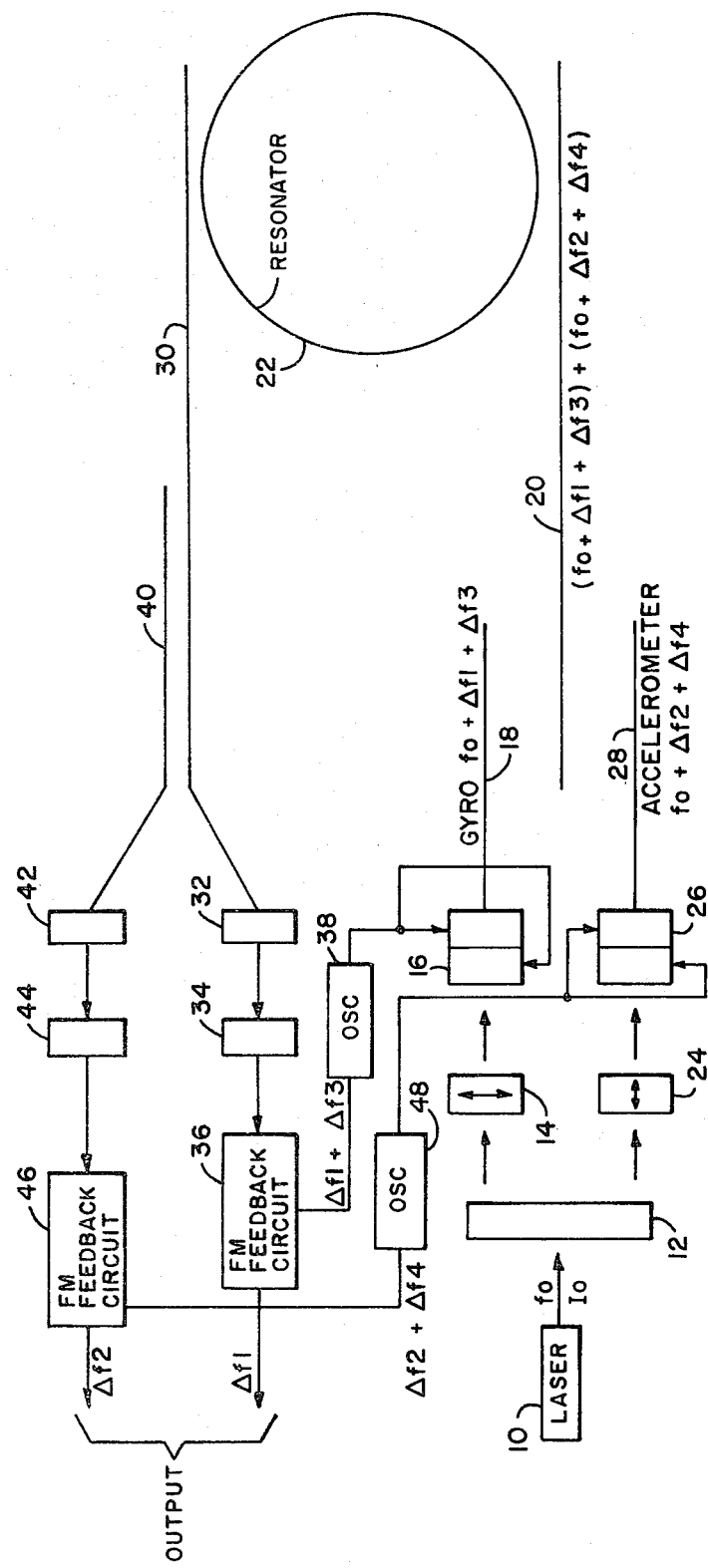
FIG. 1 is a diagrammatic, schematic view of the common resonator circuit using integrated optics and electronics.

Referring now to the drawings wherein like numbers represent like parts, a preferred embodiment of the common resonator circuit is shown in FIG. 1. A laser source 10 has an output beam of frequency fo and intensity Io. The output beam is split by a beam splitter 12, forming two laser beams. One beam is coupled through a vertical polarizer 14 into a dual Bragg cell 16, and from there into a waveguide 18. The other beam is coupled through a horizontal polarizer 24 into a dual Bragg cell 26, and from there into a waveguide 28. Waveguide 20 is disposed adjacent to both waveguide 18 and 28 so that vertically polarized energy from waveguide 18 and horizontally polarized energy from waveguide 28 is coupled into waveguide 20. A waveguide 22 lies adjacent waveguide 20 and is a closed loop forming a resonator. On the opposite side of waveguide resonator 22 from the input waveguide 20 is an output waveguide 30. Waveguide 30 couples energy from resonator 22 directly to a receiver circuit comprising analyzer 32 polarized vertically, an optical energy detector 34 for converting the optical signal to an electrical signal, and a frequency modulation (FM) feedback circuit 36 which provides both an output signal representative of vertically polarized energy passed through the resonator and a feedback signal coupled to a voltage controlled oscillator 38 which drives the dual Bragg cells 16.

Similarly, waveguide 30 couples energy into adjacent waveguide 40 for coupling energy directly to a receiver circuit comprising an analyzer 42 polarized in the horizontal direction, an optical energy detector or photodetector 44 for converting the optical signal to an electrical signal and a FM feedback circuit 46 which provides a first output signal representative of horizontally polarized energy, and a second output, a feedback signal, coupled to a voltage controlled oscillator 48 which drives the dual Bragg cells 26. Output signals $\Delta f_1$ and $\Delta f_2$ from the receiver circuits may be coupled to any monitoring system such as a visual display or a computer. Coupling between all of the waveguides may be by any of the established modes, such as waveguide to waveguide directional coupling.

Figure 2:
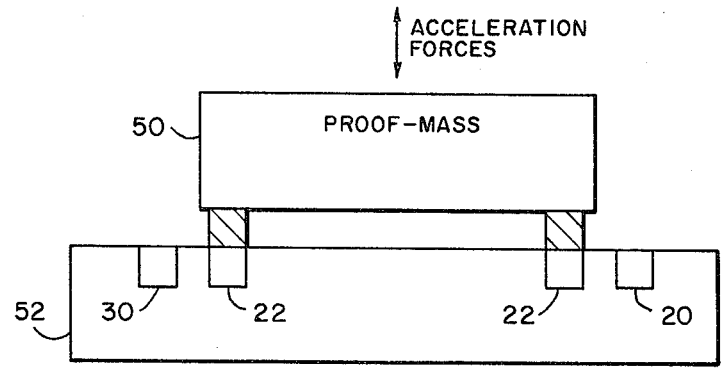
FIG. 2 is a diagrammatic view of the ring resonator waveguide assembly showing a proof-mass adapted for stressing the waveguide.

As shown in FIG. 2, a proof-mass 50, stress transfer element, is mounted on the ring resonator 22 and responds to acceleration forces normal to the surface of the waveguide to stress the entire waveguide. The electro-optic photoelastic resonator 22 and other optical circuit components are formed in an integrated optics format in substrate 52. Substrate 52 may be gallium arsinide or other similar structure used in integrated optic systems.

In operation of the common resonator circuit of FIG. 1, the respective laser beams are coupled between adjacent waveguides using waveguide-to-waveguide directional coupling (W-W-DC) methods as is well known in the art. The vertically polarized laser beam from polarizer 14 has an output frequency of fo coupled into the dual Bragg cell 16 where the vertically polarized beam is FM modulated prior to entering waveguides 18, 20, and 22. The vertically polarized laser beam coupled into resonator waveguide 22 is allowed to enter output waveguide 30 by way of W-W-DC, is received by analyzer 32 and detected by detector 34.

With no rotational input to the system ($\Delta f_1 = 0$) a beam with a frequency of $f_0 + \Delta f_3$ is coupled from Bragg cells 16 into waveguide 18. This output beam is transferred into ring resonator waveguide 22. At this frequency ($f_0 + \Delta f_3$) resonance is established in the ring resonator, and maximum beam energy circulates therein, which produces maximum bean energy transfer to the output waveguide 30. Detector 34 detects the beam energy present in waveguide 30 and provides an electrical output to feedback circuit 36. Feedback circuit 36 generates the dither frequency output, $\Delta f_3$, which maintains resonance in ring resonator 22 by stimulating the dual acousto-optic Bragg cells 16. By using two Bragg cells the laser beam output angle change is minimized. The dither frequency, $\Delta f_3$, sweeps ring resonator waveguide 22 such that the power-frequency transmission curve (not shown) of the resonator changes at a rate that produces detector 34 shot-noise-limited operation and at a frequency magnitude that includes the maximum slope points on the resonator power-frequency transmission curve so that sensitivity is maximized.

When the wavelength of the resonator input frequency $(f_o + \Delta f3)$ matches the optical path length of the resonator (resonance), peak power is transmitted to waveguide 30. The energy in waveguide 30 with frequency $f_o + \Delta f3$ (polarized vertically) is allowed to pass through analyzer 32 which is polarized in the vertical direction so that only the vertically polarized portion of the beam is allowed to activate the detector 34. The output of detector 34 is fed to frequency modulation feedback circuit 36. The feedback circuit provides an output, $\Delta f1$, which is proportional to any input rotation, where $\Delta\phi$ is the change in input rotation. A feedback path from circuit 36 to voltage controlled oscillator 38 allows the oscillator to drive dual Bragg cells 16, changing the optical frequency from $f_o$ to $f_o + \Delta f3 + \Delta f1$ if rotation occurs.

With rotational input applied in the plane of the resonator, the optical path length of the resonator is changed, detuning the resonator and generating a change in the beam intensity output coupled to waveguide 30. This change, detected by photodetector 34, is coupled to feedback circuit 36 which produces the frequency $\Delta f1$. $\Delta f1$ is added to $\Delta f3$ and provides additional drive to Bragg cell 16, thereby changing the input laser beam frequency coupled to the resonator. This change in frequency restores resonance in resonator 22. The change in frequency $\Delta f1$ varies depending on the degree of rotation and is proportional to the change in rotational input. Thus when there is a rotation rate in the plane of waveguide 22 (the input plane) the optical path length of the vertically polarized beam is changed. This detunes the cavity and peak power is not transmitted to output waveguide 30. The resulting change in $\Delta f1$ frequency is proportional to input rotation rate. This change in $\Delta f1$ restores resonance, re-establishing peak power transfer to waveguide 30.

Acceleration is measured the same way as noted herein above except the beam $(f_o + \Delta f4)$ is polarized in the horizontal direction along the extraordinary wave axis of birefringent waveguide 22. The horizontally polarized laser beam from polarizer 24 has an output frequency $f_0$ which is coupled into the dual Bragg cell 26 where the beam is FM modulated by $\Delta f2$ and $\Delta f4$ prior to entering waveguide ring resonator 22. The horizontally polarized laser beam coupled into resonator 22 is allowed to enter output waveguide 30 and is detected by detector 44. In response to the detector output, feedback circuit 46 drives Bragg cells 26 by way of the voltage controlled oscillator 48.

With no acceleration stress input to the system a beam comprising the laser frequency $f_0$ and the dither frequency $\Delta f4$ is coupled from Bragg cells 26 into waveguide 28 and 20. This output beam is transfered into ring resonator waveguide 22. At this frequency $(f_0 + \Delta f4)$ resonance is established in the ring resonator, and maximum beam energy circulates therein, which produces maximum beam energy transfer to the output waveguide 30. This energy is also coupled into waveguide 40. Detector 44 detects the horizontally polarized beam energy present in waveguide 40 and provides an electrical output to the feedback circuit.

With a stress input applied through member 50 to resonator 22, the index of refraction of the resonator is changed, detuning the resonator and generating a change in the beam intensity output coupled to waveguide 30. This change detected by detector 44 is coupled to feedback circuit 46 which produces frequency $\Delta f2$ for changing the input laser beam frequency coupled to the resonator 22. The change in frequency $\Delta f2$ varies depending on the degree of acceleration stress and is proportional to the change in stress input.

Figure 3:
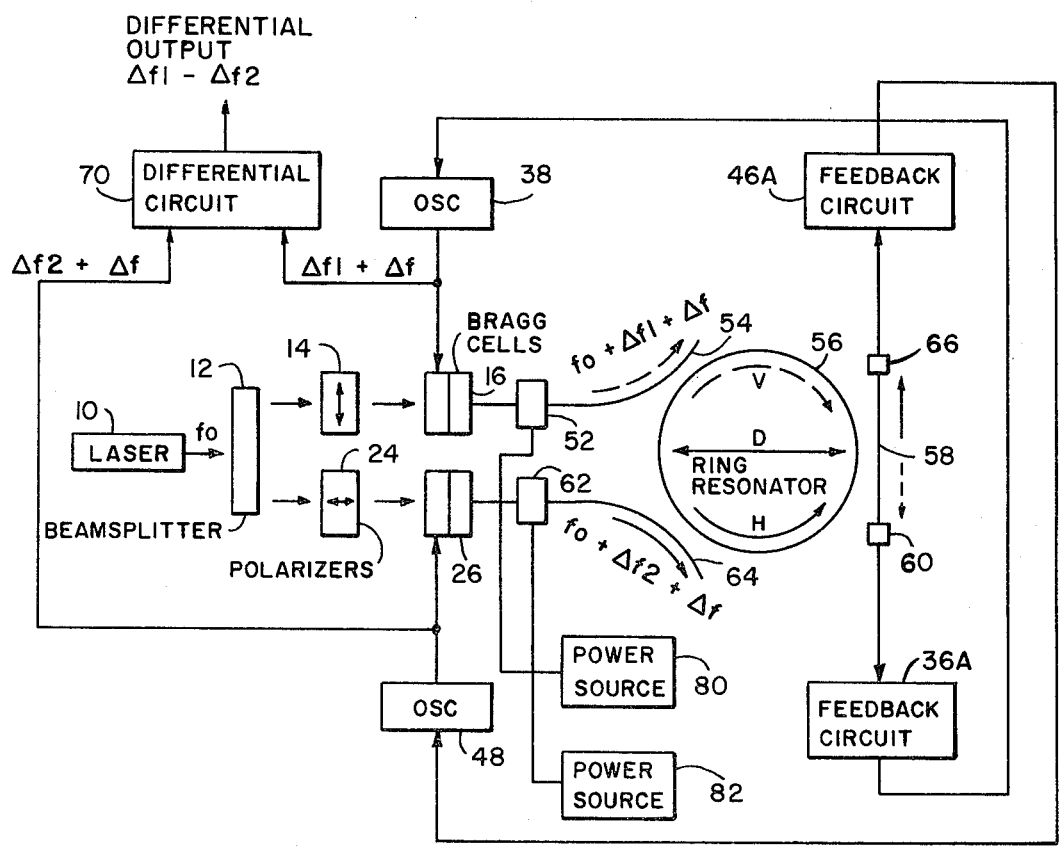
FIG. 3 is an alternate embodiment of the common resonator laser accelerometer and gyro using data sampling or alternate signal inputs.

An alternate embodiment of the invention is shown in FIG. 3 wherein sampling data techniques are employed allowing a reduction in optical paths and system components. Operation of the feedback circuit and the dither circuit is identical to that of FIG. 1, with $\Delta f1$ and $\Delta f2$ representing signal or intelligence inputs while $\Delta f3$ and $\Delta f4$ represent the dither input that cycles the input frequency back and forth through resonance. $\Delta f3$ and $\Delta f4$ may be equal $(\Delta f3 = \Delta f4 = \Delta f)$ but this is not necessary for operation since these frequencies are filtered out by their respective output demodulator circuits which may be part of the feedback circuit and are not shown. This leaves the desired intelligence $\Delta f1$ and $\Delta f2$ which may then be used separately as in FIG. 1 or may be used together $(\Delta f1 - \Delta f2)$ as in FIG. 3 to provide a differential output.

As shown in FIG. 3, the output from laser source 10 with frequency $f_o$ and intensity $I_o$ is split with beam splitter 12 forming two laser beams. One beam passes through vertical polarizer 14, dual Bragg cell 16, a 90° phase rotator 52, and into waveguide 54. The energy $(f_o + \Delta f1)$ in waveguide 54 is allowed to enter waveguide 56 using waveguide to waveguide coupling and is shown typically by the dashed arrows V. When the wavelength of the input frequency and dither frequency $(f_o + \Delta f)$ matches the optical path length of the resonator, (resonance) peak power is transmitted to waveguide 58. Energy in waveguide 58 with frequency $f_o + \Delta f$ and polarized vertically is detected by detector 60. The output of detector 60 is coupled to frequency modulation feedback circuit 36A and closes a feedback circuit to voltage controlled oscillator 38 which drives the dual Bragg cell 16.

The other beam passes through horizontal polarizer 24, dual Bragg cell 26, 90° phase rotator 62 and enters waveguide 64. This horizontally polarized beam enters ring resonator 56 and travels in the opposite direction to the first beam as shown typically by the solid arrows H. Operation is the same for both beams with detector 66, FM feedback circuit 46A and oscillator 48 producing $\Delta f2$ in response to system changes. Power sources 80 and 82 supply power to the respective 90° phase rotators 52 and 62 for controlling the positions thereof.

For gyro operation the 90° phase rotator 62 is activated, rotating the horizontally polarized beam to the vertical so that both beams are vertically polarized. When the resonator 56 is rotated in the plane of the resonator it detunes both beams. This rotational change $\Delta\phi$ is sensed as $\Delta f1$ and $\Delta f2$ by detectors 60 and 66 which results in a change in the frequencies fed back to the respective Bragg cells to restore resonance in the resonator. Thus the output from the feedback circuits contain both the dither voltage or frequency $\Delta f$ and the respective signal indicative of rotation ($\Delta f1$ and $\Delta f2$) which drives the Bragg cells. The system output of $\Delta f1 - \Delta f2$ is routinely obtained by filtering the dither out with a differential circuit 70. Differential circuit 70 may typically be a demodulator and an up-down counter for each oscillator output for providing the differential output; or a demodulator for each frequency ($\Delta f1$ and $\Delta f2$) with a differential amplifier providing the output; or respective filters with a differential amplifier. For accelerometer operation, when the proof-mass of FIG. 2 is accelerated it stresses the resonator, changing the optical path length of the resonator which detunes the resonator. Beam V remains polarized vertically and beam H remains polarized horizontally. The beams travel in opposite direction in the resonator. Beam V functions as a reference beam since stresses will not effect the optical path length for this beam because it is polarized vertically. Beam H is the signal beam because stresses will effect the optical path length because it is polarized horizontally. To measure acceleration one beam must be polarized horizontally. To measure rotation rate both beams must be polarized in the same direction preferable in the vertical direction. In both cases the output is $\Delta f_1 - \Delta f_2$.

In integrated optics systems a variety of discrete optical elements, both active and passive are integrated into a monolithic, miniaturized planar structure. It is an optical analogy of integrated circuit technology in the electronics industries. By this analogy, it is reasonable to assume that optical systems in the integrated optics configuration can be made more efficient, compact and stable at lower cost. In the embodiments shown, which are monolithic structures, gallium-arsenide is used as the substrate. Other substrates may be resorted to such as silicon or lithiumniobate, however, in these structures an interface must be used between the laser and the substrates and the detectors.

While the invention has been described in connection with certain specific embodiments thereof, it will be understood that other modifications will suggest themselves to those skilled in the art and that it is intended to cover such modifications that fall within the scope of the claims appended hereto.

I claim:

1. A common resonator accelerometer and gyro comprising: a laser for generating a beam of coherent light, polarizing means for providing respective first and second orthogonally polarized light beams output, a beamsplitter disposed between said laser and said polarizing means for coupling light therebetween, first and second photodetectors, photoelastic optical waveguide means disposed between said polarizing means and said photodetectors for providing an optical path therebetween, stress transfer means disposed adjacent to said waveguide means for subjecting said waveguide means to acceleration stress forces, modulating means disposed between said polarizing means and said waveguide means for modulating said laser light coupled to said waveguide means, and first and second feedback circuits responsive respectively to said first and second photodetectors for providing a variable feedback to said modulating means, said variable feedback being an output signal indicative of acceleration and rotational stress forces and said waveguide means comprising at least first and second input waveguides, an output waveguide, and a ring resonator waveguide therebetween.

2. A common resonator accelerometer and gyro as set forth in claim 1 wherein said modulating means comprises first and second dual Bragg cells responsive respectively to said first and second feedback circuits, and said stress transfer means being in the shape of a ring and being disposed substantially coincident with the ring surface of said ring resonator waveguide.

3. A common resonator accelerometer and gyro as set forth in claim 2 wherein said laser beam splitter, polarizing means, Bragg cells, and waveguide means are formed in a photoelastic, electro-optic substrate.

4. A common resonator accelerometer and gyro as set forth in claim 3 wherein said stress transfer means is a proof-mass disposed for transfering forces to said ring resonator that are normal to the plane of travel of laser light within said resonator.

5. A common resonator accelerometer and gyro as set forth in claim 4 and further comprising a third input waveguide adjacent to and beneath said first and second input waveguides for coupling energy from said first and second waveguides into said third waveguide and from said third waveguide into said ring resonator for rotating said orthognally polarized beams in the same direction in said resonator waveguide.

6. A common resonator accelerometer and gyro as set forth in claim 2 and further comprising first and second ninety degree rotators disposed respectively between said first and second dual Bragg cells and said waveguide means for selectively changing the polarization of light passing therethrough and thereby allowing respective light beams passed therethrough to be of like polarization or orthogonally polarized.

7. A common resonator accelerometer and gyro as set forth in claim 6 wherein said first and second input waveguides are disposed adjacent opposite sides of said ring resonator waveguide for directing respective input beams in opposite directions through said resonator waveguide.

* * * * *